March 25, 1947. D. W. JOHNSON Re. 22,856

ELECTRIC SWITCH

Original Filed April 12, 1941 2 Sheets-Sheet 1

Inventor
DAVID W. JOHNSON
by his attorneys
Howson and Howson

March 25, 1947. D. W. JOHNSON Re. 22,856

ELECTRIC SWITCH

Original Filed April 12, 1941 2 Sheets-Sheet 2

Inventor
DAVID W. JOHNSON
by his attorneys
Howson and Howson

Reissued Mar. 25, 1947

Re. 22,856

UNITED STATES PATENT OFFICE 22,856

ELECTRIC SWITCH

David W. Johnson, New Britain, Conn., assignor to The Arrow-Hart & Hegeman Electric Co., Hartford, Conn., a corporation of Connecticut Original No. 2,286,965, dated June 16, 1942, Serial No. 388,333, April 12, 1941. Application for reissue December 10, 1946, Serial No. 715,165

15 Claims. (Cl. 200—116)

This invention relates to electric switches. More particularly it relates to manually-operable electric switches having provision for automatic operation upon the occurrence of an overload current.

It is an object of my invention to provide improved switch structure provided with thermally-responsive means for causing separation of the switch contacts on the occurrence of an overload.

Another object of the invention is to provide in a switch of the above type improved means for adjusting the setting of the overload responsive means.

Another object of the invention is to provide in a switch of the above type improved means for causing opening of the contacts automatically and improved means for adjusting the overload characteristics by varying the position of the operating mechanism with respect to the thermally-responsive parts.

Other objects and advantages of my invention will become apparent as it is described in connection with the accompanying drawings.

In the drawings—

Figure 1:
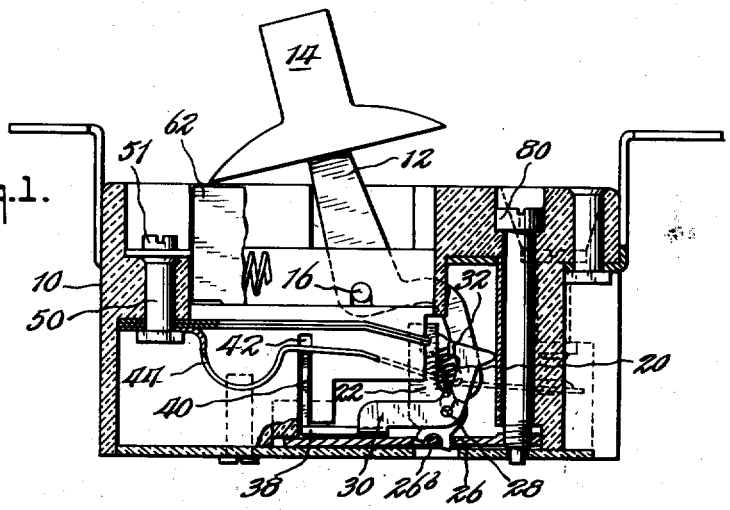
Fig. 1 is a longitudinal section view of the invention taken substantially along the line 1—1 of Fig. 5, with the switch parts in manually opened position.

Referring to the drawings, the parts of the switch are mounted within a rectangular insulating block or base 10 that is hollowed out from the bottom to form communicating cavities for the switch parts.

Adjacent the sides of the base are cavities in which move mutually-insulated contact members 44 and 46 made from thin strips of springy highly-conductive metal. One end of each spring contact is anchored in position by a hollow rivet, such as 50, which extends through the top of the base. The other ends of the contacts 44 and 46 are provided with contact buttons 44c and 46c which engage with stationary contact buttons 52c and 54c on the bottom ends of hollow rivets 52 and 54 that extend through the top of the base 10 at the opposite end from the rivets 50. Screw bolts 50s, 51, 52s and 54s thread into each of the hollow rivets 50, 52, 54. The screws 50s, 52s and 54s are binding screws for lead wires.

A slot 10s extends through the top of the base 10 for the accommodation of a stamped sheet-metal operating lever 12, upon the outer end of which is a molded insulating handle 14 of conventional design. The operating lever 12 is of irregular shape, as may be seen in Figs. 1–4. It is pivoted at a central point about a fixed pivot 16 which is mounted in slots 18 in a central position in the side walls of the base cavity. On the bottom or inner end of the operating member 12 there is a hook-like formation around which is looped one end of a coiled tension spring 20. The other end of this coil spring is secured to the central portion of a U-shaped oscillatory switching member 22. The switching member 22 preferably is stamped from sheet metal and provided with bifurcated ends. The bifurcations 22a extend through a pair of closely-spaced apertures in a flat adjustment bar 26 straddling and pivoting about the narrow portion 26b of the plate between the apertures. The parts are proportioned and positioned so that as the handle member 12 is rocked, its lower end will pass over the pivotal axis of the switching member 22 carrying with it the line of action of the spring 20 whereby the member 22 is moved from a posiiton (Fig. 2) wherein its transverse portion abuts a vertical wall of the casing to another position (Fig. 1) wherein it stands relatively vertically.

Figure 3:
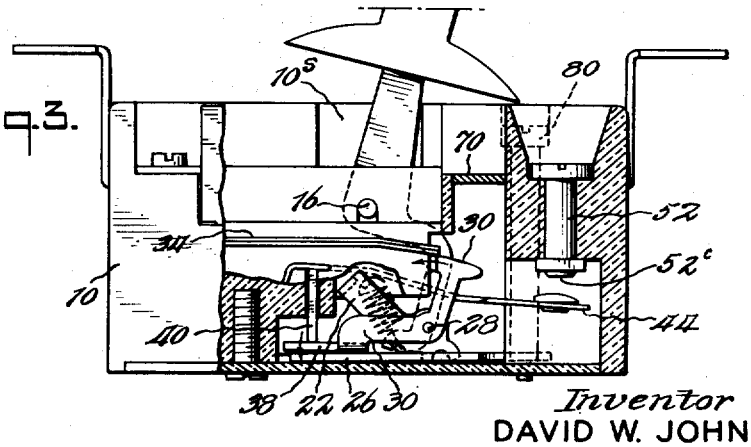
Fig. 3 is a side elevation view, partly in section, showing the switch parts in the position they occupy after automatic operation.
Figure 4:
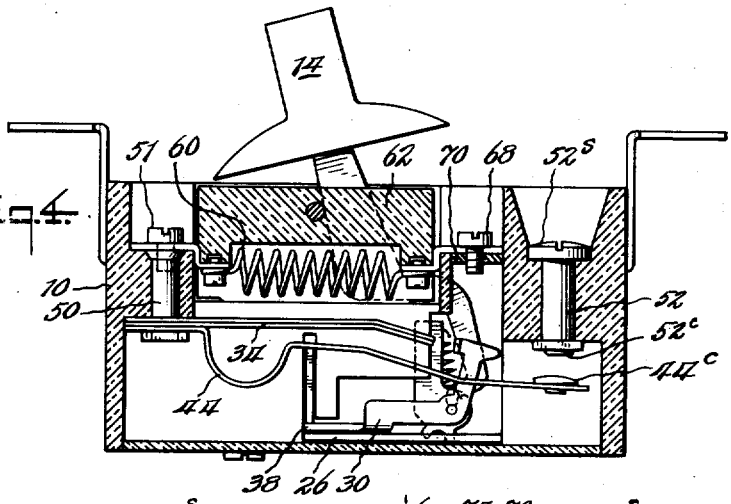
Fig. 4 is a longitudinal section view taken along line 4—4 of Fig. 5, with the parts in manually-opened position.
Figure 5:
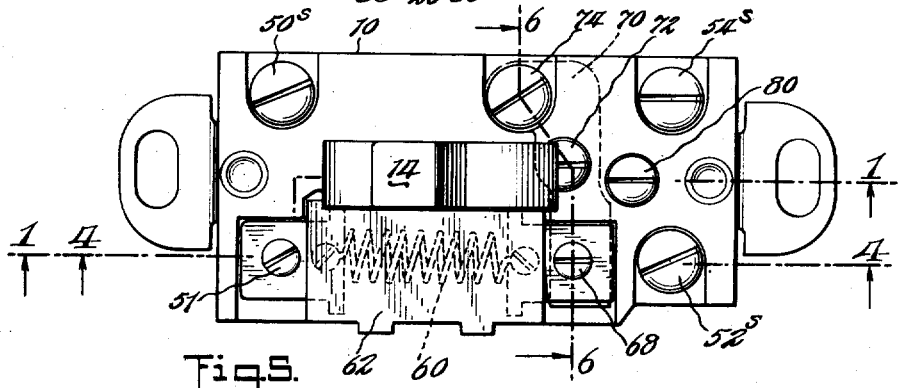
Fig. 5 is a plan view of the invention.
Figure 6:
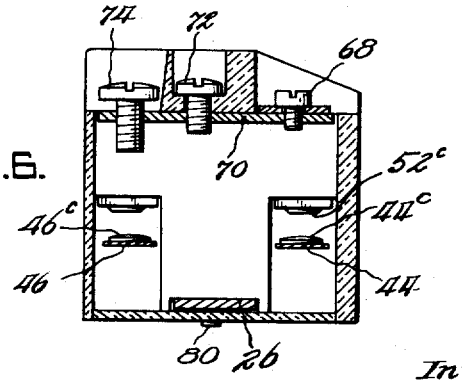
Fig. 6 is a transverse section view taken along line 6—6 of Fig. 5.

Pivotally mounted upon one leg of the member 22 is a tripping or latching member 30 which is stamped from sheet metal into the angular shape as illustrated. The member 30 is pivotally mounted on member 22 by a pin 28 passing through its central portion and through an enlargement upon one side edge of one of the legs of the member 22. The upper end of the member 30 has an abutment finger 32 turned out at right angles to the plane of the member in position to engage with and abut against one end of a bimetallic thermally-responsive member 34. The other end of the member 30 has a foot portion 38 bent at right angles to the plane of the main portion of the member 30. The plane of the foot portion 38 is substantially parallel to and overlies the plane of the adjustment bar 26 in the open circuit positions of the switch parts, as illustrated in Figs. 1, 3 and 4.

For the purpose of operating the movable switch contacts 44 and 46, a bar of insulating material 40 is positioned in a vertical slot 42 in the insulating base and has its lower edge resting upon the upper surface of the foot portion 38 of the member 30, so that as the foot portion 38 moves up and down, it will cause similar vertical movement of the insulating bar 40.

Figure 2:
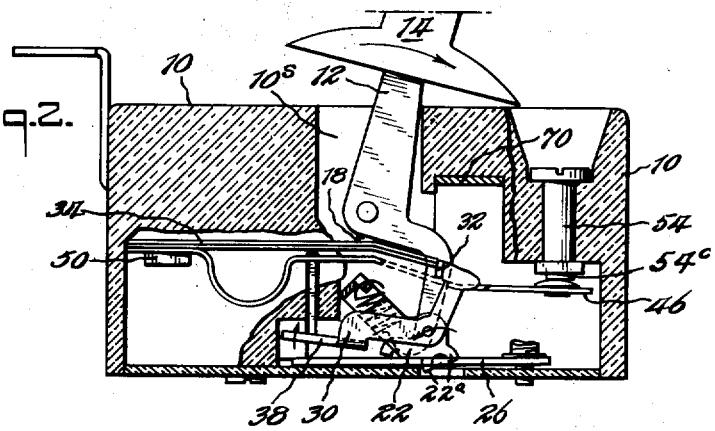
Fig. 2 is a longitudinal section view, partly broken away, showing the switch parts in closed circuit position.

By referring to Fig. 1, it will be noted that with the handle member 12 in the position there shown, the effort of the switch spring is to move the switching member 22 in a clockwise direction so as to hold it in the position shown. In that position, the abutment 32 on the member 30 is disengaged from the end of the thermal member 34 so that the force of the spring contacts 44 and 46 exerted upon the insulating bar 40 and through it on the foot portion 38 of the member 30 causes the member 30 to rest its foot portion upon the upper surface of the adjustment plate 26 with the fixed and movable contacts disengaged. If, now, the operating member is moved about its pivot 16 to the position of Fig. 2, the line of action of the switch spring will be moved across the pivotal axis of the switch member 22, causing that member to move counter-clockwise to the position shown in Fig. 2. This movement will cause the pivotal connection 28 between the member 30 and the operating member 22 to move to the left from the position of Fig. 1 to the position of Fig. 2. Such movement causes the abutment 32 to engage the end of the bimetallic member 34 and thereafter causes the member 30 to pivot about its pivotal connection 28 with the switch member 22, in turn causing clockwise movement of the member 30, raising the foot portion 38 thereof to the position of Fig. 2 and at the same time moving the insulating bar 40 upwardly. The upward movement of the insulating bar carries the flexible contact members 44 and 46 upwardly, engaging the contact buttons on the ends thereof with the stationary contact buttons.

For the purpose of influencing the bimetal 34, there is provided directly above the bimetal a heating coil 60, which may be housed within an insulating shield 62 to conserve its heat and direct the heat against the bimetal. The coil 60 is connected with the bimetal by having one end of the coil secured in position by the screw 51 that threads into the hollow rivet 50. The other end of the coil 60 is secured by a screw 68 to a conductive bar 70 extending transversely of the casing. A securing bolt 72 passes through the top of the casing into the bar 70 to secure it in position. At the opposite side of the casing from the attachment bolt or screw 68 a terminal screw 74 threads into the end of the conductive bar 70.

In connecting the switch to power lines, one wire of the power lines is attached beneath the head of the securing screws 54*s*, while the other power line is connected beneath the head of the securing screw 52*s*. The wires of the circuit to be controlled are connected to the terminal screws 50*s* and 74.

When the switch is in closed circuit position, the current from one line enters through terminal 54 and passes through the movable contact 46 to the hollow rivet and terminal screw 50*s* and the circuit. The current from the other line enters through terminal 52 and passes through the movable contact 44 to the hollow rivet 50, heating coil 60, transverse conductive bar 70 to the terminal screw 74 and the circuit.

Upon the occurrence of an overload, heat will be generated in the coil 60, causing the bimetal member 34 to flex upwardly, disengaging its end from the abutment 32 on the member 30. The resilience of movable contacts, which tend normally to separate from the fixed contacts, exerts a force upon the insulating bar 40 and through it on the foot of the member 30. This force is restrained while the switch parts are in closed circuit position due to the abutment 32 engaging the end of the bimetal member 34. However, when the abutment 32 is free from engagement with the end of the bimetal 34, the member 30 can move in a counterclockwise direction, permitting the movable contacts to move downwardly and disengage from the fixed contacts.

In order to adjust the relative position of the abutment 32 to the end of the bimetal 34, the adjustment bar 26 is mounted upon an adjustment bolt 80 which passes through the casing from top to bottom. The lower end of the adjustment bolt is screw threaded and takes into a screw threaded aperture in the adjustment plate 26. By this means, rotation of the adjustment bolt 80 will cause the adjustment plate 26 to move up and down along the axis of the adjustment bolt. Since the contact moving parts of the switch mechanism are all supported by the adjustment plate 26, it will move up or down as a unit as adjustment is made. Thus, the relative position of the abutment 32 to the end of the bimetal 34 may be varied by bodily movement of the switching mechanism as a whole. By this means, adjustment may be made of the device without imposing any stress or strain upon the bimetal member and without varying its initial set or its inherent characteristic set. It is, therefore, possible to adjust the device very accurately and the device will operate according to its adjustment in a very sharp, distinct and regular manner. The device also operates more accurately and satisfactorily because the bimetal member does not carry the main line current, nor any substantial strain.

From the foregoing, it will be observed that I have provided a novel construction of thermally-responsive, automatically and manually operable switch mechanism having few and simple parts which are easily manufactured and assembled and which operate in a very accurate and reliable manner. I have furthermore provided a novel means for adjustment which can be operated without moving the thermally responsive element but by moving the switch mechanism instead.

Many modifications of the invention will occur to those skilled in the art. Therefore, I do not limit it to the specific embodiment illustrated and described.

What I claim is:

1. In an electric switch, a manually operable operating mechanism including an over-center spring and a manually operable lever to move said spring over-center both into and from closed-circuit position, separable contacts caused to engage and disengage by said mechanism, means operable on occurrence of an overload and employing the stress of said spring to cause separation of said contacts, said overload means including a member responsive to overload conditions, and means to adjust the overload setting of the switch by moving said operating mechanism relatively to said overload responsive member without moving the latter.

2. In an electric switch, a manually operable operating mechanism, separable contacts engageable and disengageable by said mechanism, overload operating means including a bimetallic member holding said switch in closed-circuit condition, said bi-metallic member moving in response to overload condition to release and to cause separation of said contacts, and means to move said operating mechanism relative to said bi-metallic member while the latter remains fixed for the purpose of adjusting the overload operating characteristics of the switch.

3. In an electric switch, a manually operable operating mechanism, separable contacts engageable and disengageable by said mechanism, overload operating means including a bi-metallic member holding said switch in closed-circuit condition, said bi-metallic member moving in response to overload condition to release and to cause separation of said contacts, and means to move said operating mechanism relative to said bi-metallic member while the latter remains fixed for the purpose of adjusting the overload operating characteristics of the switch, an insulating base housing said mechanism and having exteriorly accessible terminals for making connections to the switch and an adjustment member accessible at the front of the base and exteriorly thereof for adjusting the position of said operating mechanism.

4. In an electric switch, a manually operable operating mechanism, separable contacts engageable and disengageable by said mechanism, a bimetallic member engaged by a part of said mechanism and adapted to disengage said part on overload to cause separation of said contacts, and means to adjust the relative positions of said bi-metal and operating mechanism by moving said mechanism while said bi-metal retains its position whereby the overload setting of the switch may be varied.

5. In an electric switch, a manually operable operating mechanism, separable contacts engageable and disengageable by said mechanism, means biasing said contacts towards separated position, an overload responsive member restraining said bias in closed-circuit condition of the switch but operable to release said mechanism and permit said biasing means to separate said contacts on overload, and means to move said operating mechanism relative to said overload responsive member while the latter remains fixed, for the purpose of adjusting the overload operating characteristic of the switch.

6. In an electric switch, separable contacts, manual operating means, pivotal means operable by said operating means, tripping means having a movable pivoted connection with said pivotal means, said pivoted connection moving in response to movements of said manual operating means to accomplish contact engagement and separation.

7. In an electric switch, separable contacts, manual operating means, pivotal means operable by said operating means, tripping means having a movable pivoted connection with said pivotal means, said pivoted connection moving in response to movements of said manual operating means to accomplish contact engagement and separation, and overload responsive means normally engaged by said tripping means and arranged to release said tripping means on overload to accomplish contact separation.

8. In an electric switch, separable contacts, manual operating means, pivotal means operable by said operating means, tripping means having a movable pivoted connection with said pivotal means, said pivoted connection moving in response to movements of said manual operating means to accomplish contact engagement and cause separation, overload responsive means normally engaged by said tripping means and arranged to release said tripping means on overload to accomplish contact separation, and means to adjust the position of said tripping means relative to said overload responsive means while the latter remains unmoved.

9. In a switch, a pivoted operator, a rockable member having a spring connection with said operator and being movable in response to movement of said operator, a tripping member pivotally mounted on said rockable member and movable by said rockable member, separable contacts engaged and separated by movements of said tripping member as said operator is moved, and overload means to release said tripping member to cause contact separation automatically.

10. In a switch, a pivoted operator, a rockable member having a spring connection with said operator and being movable in response to movement of said operator, a tripping member pivotally mounted on said rockable member and movable by said rockable member, separable contacts engaged and separated by movements of said tripping member as said operator is moved, overload means to release said tripping member to cause contact separation automatically and adjustable supporting means for said rockable member causing movement of the switch mechanism toward or away from said overload means to vary the overload characteristics of the switch.

11. In a switch, a pivoted operator, a rockable member having a spring connection with said operator and being movable in response to movement of said operator, a tripping member pivotally mounted on said rockable member and movable by said rockable member, separable contacts engaged and separated by movements of said tripping member as said operator is moved, a bi-metal strip engaged by said tripping member and releasing said tripping member on overload, and a movable support for moving said tripping member relative to said bi-metal strip while the latter remains stationary, whereby variation of the overload setting can be made.

12. In an electric switch, a manually operable operating mechanism including spring biasing means, separable contacts engageable and disengageable upon actuation of said mechanism, said spring means biasing said contacts toward open-circuit position from closed-circuit position, overload operating means operable to cause separation of said contacts, said overload means including a current responsive member restraining said spring means in closed-circuit position of the switch, and means to move said operating mechanism relative to said current responsive member while the latter remains fixed for the purpose of adjusting the overload operating characteristics of the switch.

13. In an electric switch, separable contacts, manual operating means, pivotal means operable by said operating means, spring means to cause said contacts to engage and disengage, tripping means having a movable pivoted connection with said pivotal means, said pivoted connection moving in response to movements of said manual operating means to accomplish contact engagement and separation.

14. In an electric switch, separable contacts, manual operating means, pivotal means operable by said operating means, spring means to cause said contacts to engage and disengage, tripping means having a movable pivoted connection with said pivotal means, said pivoted connection moving in response to movements of said manual operating means to accomplish contact engagement and separation, and overload responsive means normally engaged by said tripping means and arranged to release said tripping means on overload to accomplish contact separation.

15. In an electric switch, separable contacts, manual operating means, pivotal means operable by said operating means, spring means to cause said contacts to engage and disengage, tripping means having a movable pivoted connection with said pivotal means, said pivoted connection moving in response to movements of said manual operating means to accomplish contact engagement and separation, and overload responsive means normally engaged by said tripping means and arranged to release said tripping means on overload to accomplish contact separation, and means to adjust the position of said tripping means relative to said overload responsive means while the latter remains unmoved.

DAVID W. JOHNSON.

REFERENCES CITED

The following references are of record in the file of this patent:

FOREIGN PATENTS

| Number | Country | Date |
|---|---|---|
| 415,393 | British | Aug. 20, 1934 |